Figure 1:
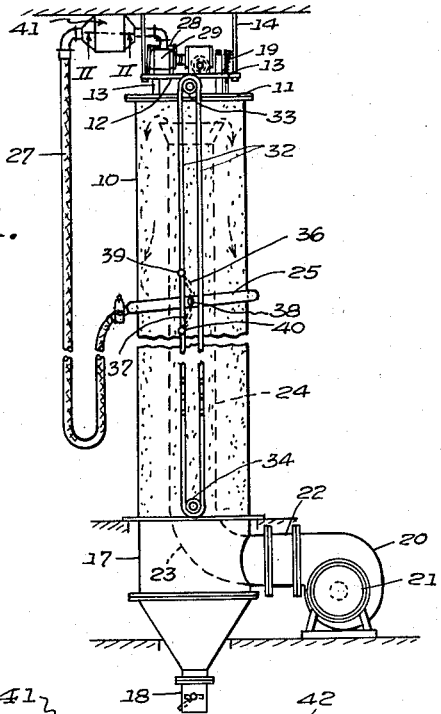

Nov. 29, 1960      J. S. LAGARIAS      2,962,120
CLEANING OF CLOTH FILTER MEDIA
Filed Sept. 10, 1959

INVENTOR.
JOHN S. LAGARIAS.
BY Fred P. Kostka
his ATTORNEY

United States Patent Office 2,962,120
Patented Nov. 29, 1960

2,962,120

CLEANING OF CLOTH FILTER MEDIA

John S. Lagarias, Pittsburgh, Pa., assignor to Koppers Company, Inc., a corporation of Delaware Filed Sept. 10, 1959, Ser. No. 839,210

2 Claims. (Cl. 183—61)

This invention relates to cleaning of filters employing cloth filter media.

In conventional industrial filters, the dust-laden gas, usually air, flows into the interior of a vertically disposed filter tube at its upper end and leaves the tube dust-free, escaping outwardly through the interstices of the cloth media of the tube. The dust remains as a layer on the inner surface of the tube. This layer is removed generally by blowing relatively high pressure air from a ring surrounding the tube through the cloth media from the outside. This ring has an elongated slot around its inner periphery for the discharge of such high pressure air. The inner diameter of the cleaning air or blow ring is made less than the outer diameter of the tube when distended so that the air will pass through the cloth media. The ring is usually reciprocated slowly up and down the filter bag so as to clean the whole tube. The air passing from the blow ring through the cloth media into the interior of the filter tube eventually escapes outwardly through the portions of the cloth media not in contact with the ring.

In certain filtering operations, it has not been possible to thoroughly clean the filter media. Many fine particles diffuse and remain embedded in the fibers of the filter cloth, and it has not been possible to dislodge them by conventional means. This has resulted in an increased pressure drop across the filter and ultimately an overall loss in capacity. When the temperature at the filter installation depends upon the capacity of the gas being handled, a reduction in gas flow may lead to a disastrous increase in temperature. To prevent this, it is necessary to thoroughly clean the filter cloth and thus lower the pressure drop to increase capacity.

Because of the nature of forces involved, it is very difficult to remove particles embedded in a mat. At velocities five to ten times conventional, the reverse jet still is ineffective on fines which may be adhering due to electrostatic forces, condensation caking, sublimation or van der Waals attraction. The force applied to remove such embedded particles must not only be large in magnitude but must have the proper frequency to be utilized effectively.

It has now been found that the cloth media can be readily cleaned when a sonic generator is operated in the reverse jet system so that the reverse jet has a sonic pressure wave superimposed on it. A specific directional application of sonic vibration is applied to the cloth to clean the filter media. Because of the small amount of filter cloth being cleaned at a time, the size of the sonic generator can be relatively small.

Figure 2:
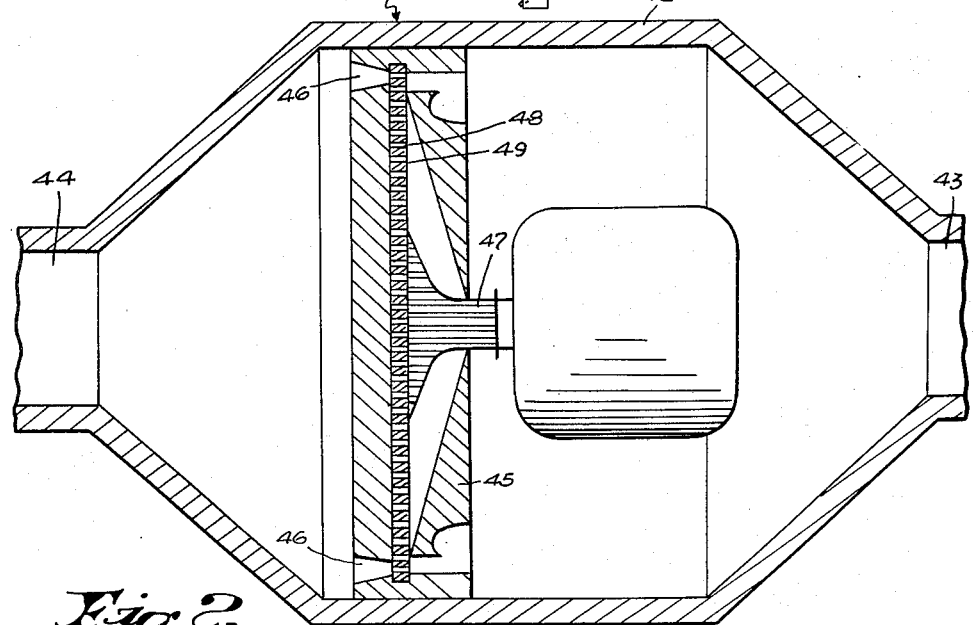

In the drawings where like parts are marked alike:

Fig. 1 is an elevational view of a filter incorporating an embodiment of the invention; and Fig. 2 is a cross-sectional view taken along the lines 2—2 of Fig. 1.

Turning now to the drawings, the filter comprises generally a tube of suitable filtering cloth media, preferably felt. The extending flange of a circular closure 11 is attached to the upper end of tube 10. This closure is suspended from a platform 12 by bolts 13, and platform 12 is suspended from the floor above by bolts 14.

The tube 10 empties into the top of a hopper 17 which has a discharge spout 18. Springs 19 hold the tube taut in a vertical direction.

A blower 20 feeds dust-laden air through an intake pipe 21, discharge pipe 22, elbow 23, and vertical extension 24 into the upper part of the filter tube, so that the incoming air with a low dust concentration is not mixed with the air in the lower part of the tube having a very high dust concentration. The air escapes outwardly through the pores of the filter and the dust remains on the inner surface of the filter and embeds in the interstices in the superficial portions of the filter material. Unless this dust is periodically removed, greater pressure will be required to force the air through the filter.

Usually the removal of dust is accomplished by reversal of air flow. A cleaning air or blow ring 25 having an internal diameter slightly less than the external diameter of the filter tube when distended by the pressure of the dust-laden air and along its inner periphery this ring has a series of slots 26 for the discharge of the relatively high pressure cleaning air is provided for this purpose. Air is supplied through a flexible hose 27 from an air-pump 28 driven by motor 29. Two chains 32 on sprocket wheels 33 and 34 on diametrically opposite sides of the filter tube 10 reciprocate blow ring 25. The sprockets 33 are driven continuously in unison through a worm reduction gear by motor 29.

The blow ring is connected to each chain 32 by two chain lengths 37 and 36, each connected at one end to a pin 38 on the blow ring and at their other ends to pins 39 and 40 projecting laterally from the sprocket chain.

These chain lengths 36 and 37 are longer than the diameter of the sprocket wheels 33 so that, at the end of the upward movement of the blow ring, when the pins 39 and 40 pass over the tops of the sprocket wheels 33, the pins 38 are below the bottoms of such sprockets. At the end of its downward movement, the blow ring rests on the top of the hopper 17 before the pins 38 strike the sprockets 34.

The foregoing has described conventional equipment. In accordance with this invention, the filter media of tube 10 is cleaned by the application of vibratory waves generated by sonic means.

This is accomplished in accordance with the present invention, the blow ring 25 which is used to supply the reverse jet and now passes the air through a sonic generating device, the output of which goes to the blow ring. Frequency and amplitude are controlled to give the maximum power output through the slit in the blow ring commensurate with satisfactory bag cleaning.

As shown in Fig. 2, the sonic generating device may be in the form of a siren 41 comprising a housing 42 of which the inlet end 43 is connected in the line adjacent the air pump 28 and of which the outlet end 44 is connected to the line leading to the blow ring 25. Centrally supported within the housing is a stator 45 having angularly spaced ports 46 through which the air flowing from the air pump 28 passes. Periodically, interrupting the flow of the air through the ports 46 is a motor driven rotor 47 having radially spaced arms 48 which are arranged to extend over the ports. The arms of the rotor are formed with a plurality of teeth-like openings 49 through which the air passes even when the arms 48 are extended over the ports P. The rate of rotation of the rotor 47 determines the frequency of the sonic sound generated by the siren.

For coarser dust such as ore dust, the frequency may be reduced and also the intensity of the sonic vibration.

For example, 1,000 cycles per second having a power density of ½ watt/ft.³ is effective to clean a typical iron ore dust.

It has been found that the frequency should be approximately 15,000 cycles and that satisfactory power density in the order of 30 watts/ft.³ are effective to clean a filter media which has been subjected to cleaning a gas containing fine particles in the order of substantially less than minus 325 mesh. For the reverse jet volume of 10 c.f.m., this corresponds to a generator having a capacity of 300 watts.

While a perferred embodiment of generator has been described, it is to be recognized that other types of sonic generation equipment which may be used in this invention include magnetostriction transducers, piezoelectric transducers, pulsating jets, vortex whistles and resonant cavity whistles to supply the sonic wave.

The foregoing has described a novel system for effectively cleaning filter cloths. Advantageously, the sonic vibration produces a filter cloth that is thoroughly cleaned resulting in higher capacity. In addition, in the conventional method, the pressurized air created a moisture problem since the moisture content in the air tended to condense in the filter media. This, of course, made the dirt more adherent to the filter and, accordingly, more difficult to remove the dirt from the interstices. When the dirt is removed sonically, in accordance with the present invention, this problem of moisture content is substantially diminished.

What is claimed is:

1. A dust filter comprising a filter tube, a blow ring encircling said tube, means for reciprocating said blow ring along the longitudinal axis of said tube, a source of air, means connecting said source of air with said blow ring, and means for generating sonic frequencies at about 1500 cycles and at a power density in the order of 30 watts/ft.³ said sonic generating means being disposed in said connecting means between said source of air and said blow ring so that said tube is periodically flexed at localized areas along its length and at different locations by the vibratory waves created by said sound generating means and transmitted by said air as said blow ring reciprocates to thereby shake dust loose therefrom.

2. The invention as defined in claim 1 in which the filter tube is formed of woven cloth and in which said sonic generating means is a siren type.

References Cited in the file of this patent

UNITED STATES PATENTS

| | | |
|---|---|---|
| 2,495,635 | Hersey | Jan. 24, 1950 |
| 2,769,506 | Abboud | Nov. 6, 1956 |
| 2,854,091 | Roberts et al. | Sept. 30, 1958 |